(12) United States Patent
Ogawa

(10) Patent No.: US 6,829,088 B2
(45) Date of Patent: Dec. 7, 2004

(54) PICTURE DISPLAY OF REAR SURFACE PROJECTION TYPE

(75) Inventor: Jun Ogawa, Tokyo (JP)

(73) Assignee: NEC Viewtechnology, Ltd., Tokyo (JP)

(*) Notice: Subject to any disclaimer, the term of this patent is extended or adjusted under 35 U.S.C. 154(b) by 0 days.

(21) Appl. No.: 10/040,620

(22) Filed: Jan. 9, 2002

(65) Prior Publication Data

US 2002/0089743 A1 Jul. 11, 2002

(30) Foreign Application Priority Data

Jan. 9, 2001 (JP) .................................. 2001-001032

(51) Int. Cl.[7] .......................... G03B 21/56; G02B 3/08
(52) U.S. Cl. ................................ 359/460; 359/742
(58) Field of Search ........................... 359/443, 457, 359/460, 742, 455, 456

(56) References Cited

U.S. PATENT DOCUMENTS

| | | | | |
|---|---|---|---|---|
| 4,185,901 A | * | 1/1980 | Behr ........................... | 359/457 |
| 4,674,836 A | * | 6/1987 | Yata et al. .................... | 359/457 |
| 5,870,225 A | * | 2/1999 | Ogino et al. ................ | 359/457 |
| 6,023,369 A | * | 2/2000 | Goto ........................... | 359/443 |
| 6,417,966 B1 | * | 7/2002 | Moshrefzadeh et al. .... | 359/460 |
| 6,437,914 B1 | * | 8/2002 | Hall et al. ................... | 359/457 |

FOREIGN PATENT DOCUMENTS

| | | |
|---|---|---|
| JP | S61-208041 | 9/1986 |
| JP | S62-257140 | 11/1987 |
| JP | S63-32528 | 2/1988 |
| JP | H4-274723 | 9/1992 |
| JP | H4-287033 | 10/1992 |
| JP | H5-197022 | 8/1993 |
| JP | H6-27535 | 2/1994 |

* cited by examiner

Primary Examiner—Christopher E Mahoney
(74) Attorney, Agent, or Firm—Sughrue Mion, PLLC

(57) ABSTRACT

A light flux modulated by a picture is shot out from a liquid crystal projector, and projected on the rear surface of the transparent screen, and a user enjoys the picture from the front side thereof. The sawlike prismatic surface is formed on the rear surface of the transparent screen. Edges of the sawlike prismatic surface form concentric circles centering around a point which is given as an intersection of an optical axis of the projector and a downward extensions of the transparent screen. A face looking downward transmits the light flux incident thereon into the transparent screen efficiently on condition that an angle formed by the incident ray of light and the optical axis of the projector is greater than 40° and less than 90°. A face looking upward totally reflects the ray of light incident thereon to the light-shooting surface, if the aforementioned condition is satisfied.

6 Claims, 5 Drawing Sheets

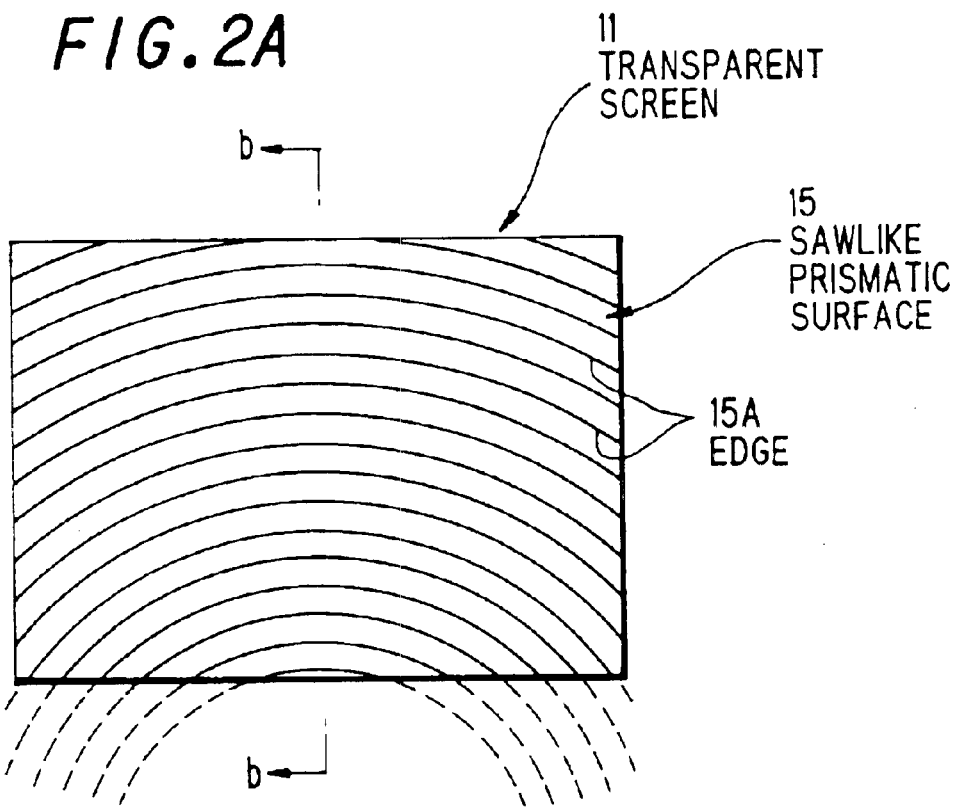
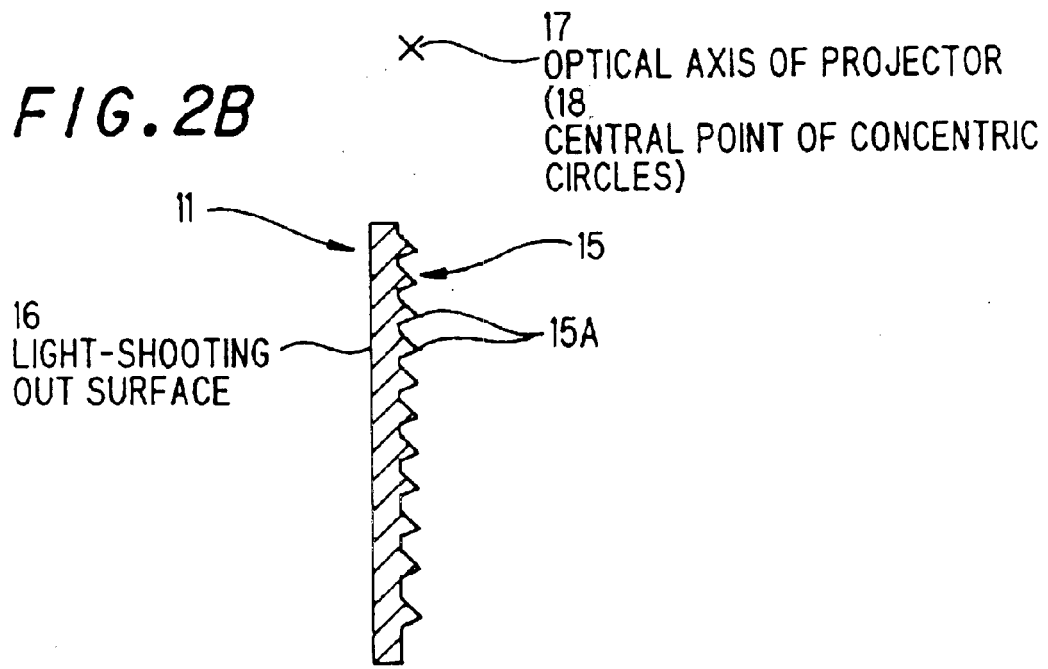
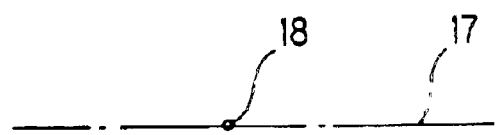

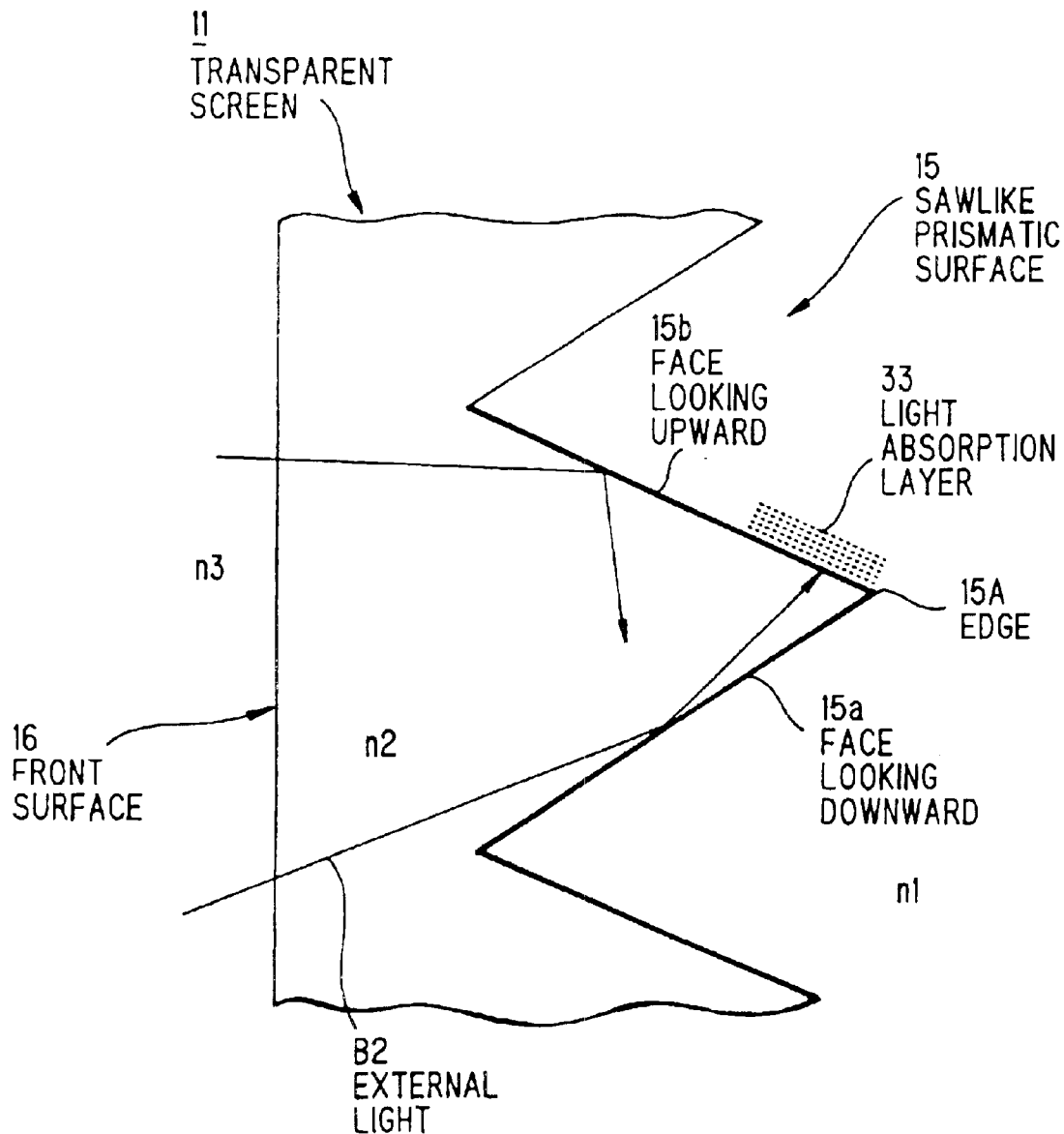

PICTURE DISPLAY OF REAR SURFACE PROJECTION TYPE

FIELD OF THE INVENTION

The invention relates to a picture display of the rear surface projection type, and especially to a picture display of the rear surface projection type in which a light flux modulated by a picture is projected on a rear surface of a transparent screen, and the projected picture is enjoyed by a user from the front side of the transparent screen.

BACKGROUND OF THE INVENTION

Some of the picture displays of the rear surface projection type developed in recent years are provided with built-in picture-forming units, such as liquid crystal light valves or digital mirror devices. In the aforementioned apparatus, the light flux outputted from the light source is modulated by the picture generated in the picture-forming unit, shot out from the projector, and projected on the rear surface of the transparent screen. The picture projected on the screen is enjoyed by a user from the front side of the transparent screen.

However, if the picture display of the rear surface projection type is used in such a condition that the optical axis of the projector is intersected with the transparent screen perpendicularly, the distance between the projector and the transparent screen cannot be shortened, and it becomes difficult to make the picture display thin. In order to solve the aforementioned problem, it is the general trend that the angle of view of a projection optical system of the projector is widened, the projector is shifted down to a position lower the transparent screen, and the light flux shot out from the projector is projected on the rear surface of the transparent screen obliquely.

However, in the aforementioned picture display of the rear surface projection type, since the incidence angle of the light flux incident on the transparent screen becomes large, and thereby the greater part of the incident light flux is reflected at the rear surface of the transparent screen and cannot be transmitted thereinto, the brightness of the picture becomes low when viewed from he front side of the screen, and the quality of the picture is degraded.

SUMMARY OF THE INVENTION

Accordingly, it is an object of the invention to provide a picture display of the rear surface projection type in which an incident light flux is efficiently transmitted into a transparent screen even when an incidence angle of a light flux increases because of the widened angle of view of a projection optical system, and the brightness and the quality of a picture are certainly prevented from being degraded because of reflection of an incident light flux at a rear surface of a transparent screen, and a picture with the excellent quality can be enjoyed.

According to the feature of the invention, a picture display of the rear surface projection type comprises:

a projector for shooting out a light flux modulated by a picture, a transparent screen, on a rear surface of which the light flux shot out from the projector is projected, and a sawlike prismatic surface which is formed on the rear surface of the transparent screen, and provided with plural edges shaped into concentric circles centering around a central point situated outside the transparent screen, wherein an optical axis of the projector passes through the central point, and a ray of light incident on a first face looking downward and neighboring with each of the plural edges is efficiently transmitted into the transparent screen, and the ray of light transmitted through the first face is totally reflected by a second face looking upward and neighboring with the same edge to a front surface of the transparent screen, in case that a angle formed by the ray of light incident on the first face and the optical axis of the projector is greater than 40° and less than 90°.

In the picture display of the rear surface projection type according to the invention, when the angle formed by the optical axis of the projector and the ray of light incident on the first face is greater than 40° and less than 90°, the ray of light incident on the first face looking downward and neighboring with each edge formed on the sawlike prismatic surface is efficiently transmitted into the transparent screen, and totally reflected by the second face looking upward and neighboring with the same edge to the front surface of the transparent screen. Accordingly, even in case that the angle of view of the projection optical system is widened, and thereby the incidence angle of the light flux incident on the transparent screen increases, the incident light flux is efficiently transmitted into the transparent screen, and can be totally reflected to the front surface thereof. Accordingly, the brightness and the quality of the picture are certainly prevented from being degraded, and the picture with the excellent quality can be enjoyed by the user.

In order to achieve the aforementioned object of the invention, an angle a $\alpha_2$ formed by the first face and a line perpendicular to the optical axis of the projector is given by a following equation that $$\tan\alpha_2 = [n_2 \sin\{\sin^{-1}((n_3/n_2)\sin\theta_2 + n_1 \sin\theta_1) + 2\alpha_1\} + n_1 \sin\theta_1]/[n_1 \cos\theta_1 - n_2 \cos\{\sin^{-1}((n_3/n_2)\sin\theta_2 + n_1 \sin\theta_1) + 2\alpha_1\}],$$

wherein a refractive index of the first medium brought into contact with the sawlike prismatic surface of the transparent screen is denoted by $n_1$, a refractive index of the second medium forming the transparent screen is denoted by $n_2$, a refractive index of the third medium brought into contact with a front surface of the transparent screen is denoted by $n_3$, an angle formed by the ray of light incident on the first face and the optical axis of the projector is denoted by $\theta_1$, a refraction angle of a ray of light shot out from the front surface of the transparent screen is denoted by $\theta_2$, and an angle formed by the first and second faces is denoted by $\alpha_1$.

When the refractive indexes $n_1$ to $n_3$ the angle $\theta_1$ formed by the optical axis of the projector and the ray of light incident on the first face looking downward, etc. are given in the process for fabricating the sawlike prismatic surface, the angle $\alpha_2$ (the Fresnel angle) are determined from the above equation, and the structure of the sawlike prismatic surface in which various incommoditeis, such as the surface reflection of light etc., can be avoided is uniquely determined.

In order to achieve the aforementioned object of the invention, a transmission efficiency $\eta$ of the ray of light incident on the sawlike prismatic surface is given by a following equation that $$\eta = \sin\alpha_2 \cos\alpha_2 \{\tan(90°-\alpha_2) + \tan\theta_1\}\{(1/\tan\alpha_1) - \tan\theta_{1b}\},$$

wherein $\theta_{1b}$ is a refraction angle of the ray of light incident on the first face looking downward of the sawlike prismatic surface. If $\alpha_1$ such that $\eta$ is greater that 1 is determined from the above equation, the picture with the excellent quality can be obtained without attenuating its brightness.

Moreover, it is desirable to form a light absorption layer for absorbing an external light penetrating into the transparent screen through a front surface thereof on an external surface of each of the second faces looking upward. For example, if the external light penetrates into the transparent screen through the front surface thereof toward the rear side, there arises a possibility that the external light will be scattered diffusedly by inner surfaces of a casing for accommodating the transparent screen, and undesired images (ghosts) will be formed at irregular positions on the picture. However, if the aforementioned structure is adopted, since the external light is absorbed by the light absorption layer and not transmitted toward the rear side, the undesired images can be certainly prevented from being formed.

BRIEF DESCRIPTION OF DRAWINGS

The invention will be explained in more detail in conjunction with appended drawings, wherein:

FIG. 2A shows a back view of a transparent screen used in a picture display of the rear surface projection type shown in FIG. 1, FIG. 2B shows a cross-sectional view of the transparent screen shown in FIG. 2A taken along a line b—b, FIG. 5 is a cross-sectional view for showing a structure of a modified transparent screen, on the sawlike prismatic surface of which a light absorption layer is formed.

DESCRIPTION OF PREFERRED EMBODIMENT

Figure 1:
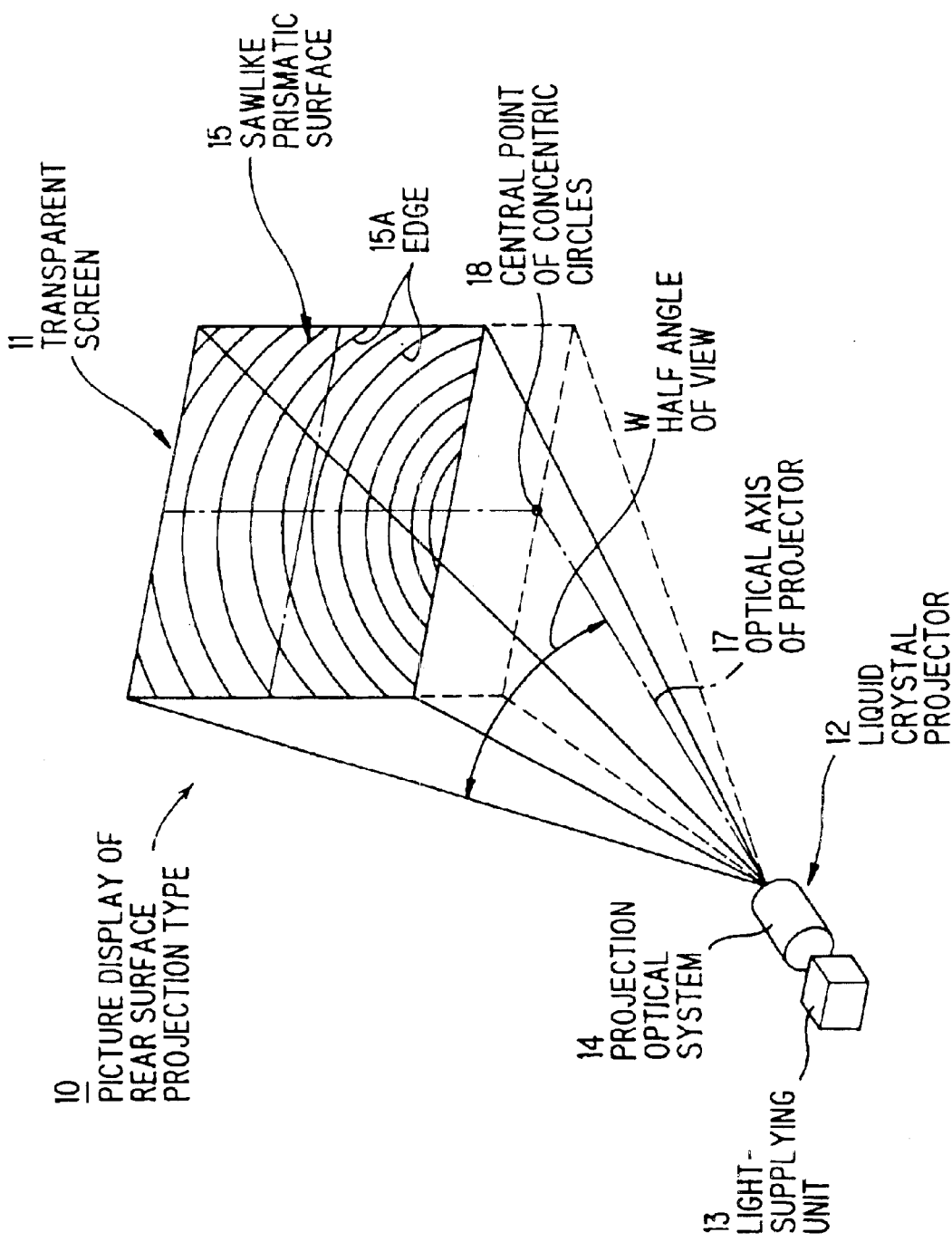
FIG. 1 is a perspective view for showing a fundamental structure of a picture display of the rear surface projection type according to a preferred embodiment of the invention.

Hereafter, a preferred embodiment of the invention will be explained in detail referring to the drawings. FIG. 1 is a perspective view for showing a fundamental structure of a picture display of the rear surface projection type. The picture display of the rear surface projection type 10 is composed of a transparent screen 11, and a liquid crystal projector 12 for projecting a light screen 11. The projected picture is enjoyed by a user from the front side of the transparent screen 11.

The transparent screen 11 is approximately shaped into a rectangular plate formed of glass or transparent plastics, and a sawlike prismatic surface 15 is formed on the rear surface thereof. The sawlike prismatic surface 15 is provided with plural edges 15A which are shaped into concentric circles centering around a central point 18 to form a Fresnel lens, where the central point 18 is on an intersection of the optical axis 17 of the liquid crystal projector 12 and a downward extension of the sawlike prismatic surface 15.

The liquid crystal projector 12 is composed of a light-supplying unit 13 containing a light source (not shown) and a picture-forming unit (not shown) therein and a projection optical system 14 for projecting the light flux modulated by a picture on the rear surface of the transparent screen 11. The liquid crystal projector 12 is so constructed that half the angle of view W which is defined as an angle formed by the optical axis 17 of the projector 12 and the outermost light of the light flux projected on the transparent screen 11 is less than 90°.

FIG. 2A is a back view of the transparent screen 11, and FIG. 2B is a cross-sectional view of the same taken along a line b—b.

As shown in FIG. 2A, the surface of the sawlike prismatic surface 15 is formed of the plural edges 15A shaped into the concentric circles centering around the central point 18. As shown in FIG. 2B, the plural edges 15A project towards the right side on the rear surface of the transparent screen 11. On the other hand, a light-shooting out surface 16 with a flat face is formed on the front of the transparent screen 11.

Figure 3:
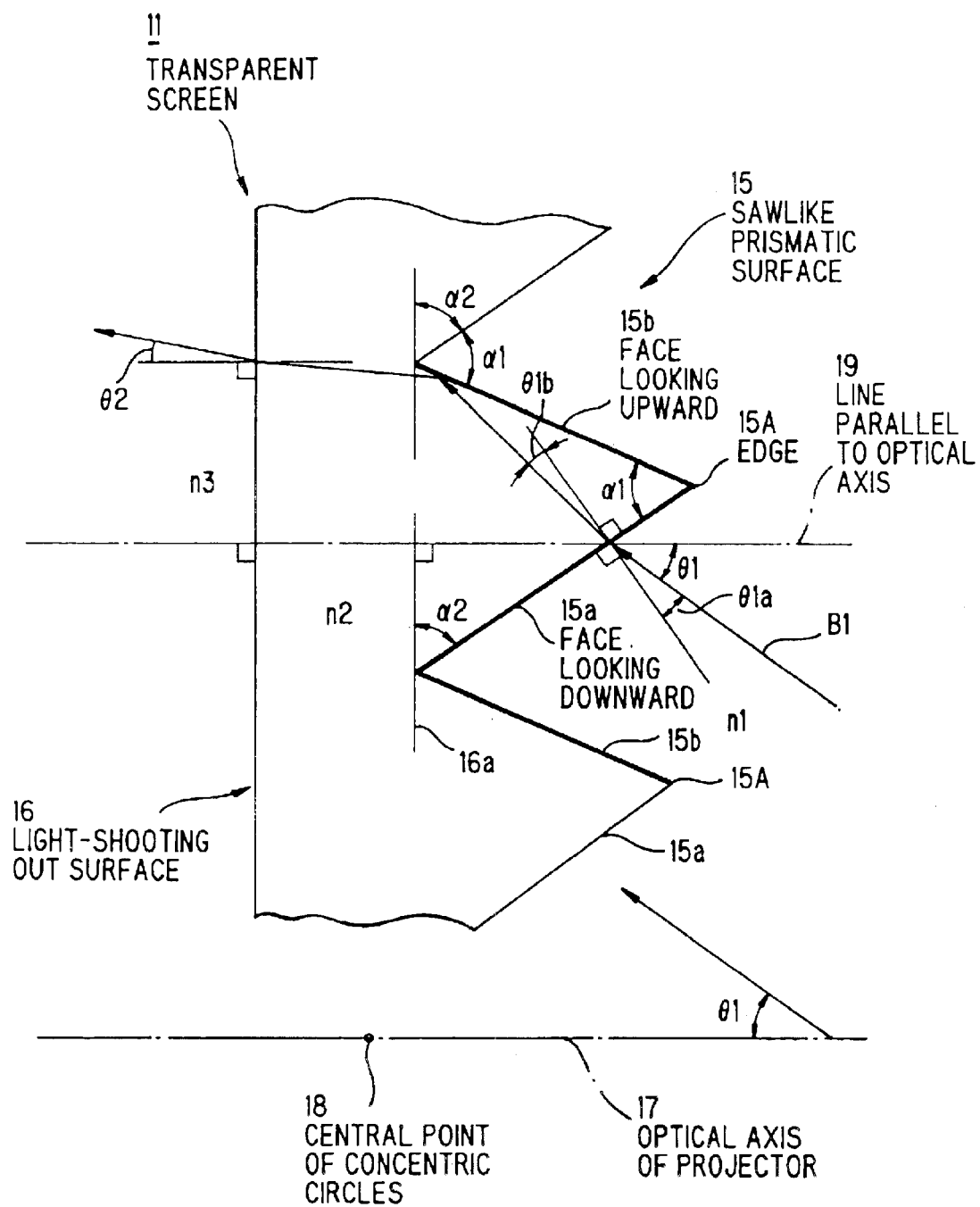
FIG. 3 is a cross-sectional view for showing optical paths of a ray of light incident on a sawlike prismatic surface formed on a transparent screen shown in FIGS. 2A, 2B.

FIG. 3 partially enlarges a portion of FIG. 2B, and is a cross-sectional view of showing paths of a ray of light incident on the sawlike prismatic surface 15. As shown in FIG. 3, the sawlike prismatic surface 15 includes plural prisms, each of which is formed of a face 15a looking downward and neighboring with an edge 15A and the other face 15b looking upward and neighboring with the same edge 15A, where the vertex angle formed by the faces 15a, 15b is given as $\alpha_1$. As explained referring to FIGS. 1, 2A formerly, the shape of each edge 15A is circular, when viewed from the side of the liquid crystal projector 12. Now, as shown in FIG. 3, an angle formed by the ray of light $B_1$ incident on the face 15a looking downward (in other words, incident on the sawlike prismatic surface 15) and a line 19 which is parallel to the optical axis 17 of the projector 12 is denoted by $\theta_1$, and $\theta_1$, is assumed to be greater than 40° and less than 90°. The sawlike prismatic surface 15 used in the embodiment is so contracted that, if the aforementioned conditions are satisfied, the ray of light $B_1$ incident on the face 15a looking downward is efficiently transmitted into the transparent screen 11, and the ray of light incident on the face 15b looking upward is totally reflected to the light-shooting out surface 16.

For example, when the ray of light $B_1$ contained in a light flux outputted from the liquid crystal projector 12 is intersected with the face 15a at an incidence point, a normal of the face 15a and the line 19 parallel to the optical axis 17 of the projector 12 are respectively drawn at the incidence point. The incidence angle of the ray of light $B_1$ is denoted by $\theta_{1a}$. If the incident ray of light $B_1$ is the outermost one of the light flux outputted from the projector 12, $\theta_1$ becomes equal to half the angle of view W of the projector 12.

The ray of light $B_1$ incident on the face 15a at the incidence of $\theta_{1a}$ is efficiently transmitted into the transparent screen 11, because the incidence angle $\theta_{1a}$ is small. As shown in FIG. 3, the refraction angle of the refracted ray of light is denoted by $\theta_{1b}$. Moreover, the ray of light incident on the face 15b situated opposite to the face 15a is totally reflected to the light shooting-out surface 16. In this case, the refraction angle of the ray of light shot out from the light-shooting out surface is given as $\theta_2$.

In order to realize the functions of introducing the ray of light $B_1$ incident on the face 15a looking downward into the transparent screen 11 efficiently, and of totally reflecting the ray of light incident on the face 15b looking upward to the front surface 16 of the transparent screen 11, the sawlike prismatic surface 15 can designed in accordance the equations mentioned later.

That is to say, if the refractive index of the first medium (such as air) which is brought into contact with the sawlike prismatic surface 15 formed on the transparent screen 11 is denoted by $n_1$, the refractive index of the second medium forming the transparent screen 11 is denoted by $n_2$, the refractive index of the third medium (such as air) which is brought into contact with the light-shooting out surface 16 of the transparent screen 11 is denoted by $n_3$, the angle formed by the optical axis 17 and the ray of light $B_1$ incident on the face 15a looking downward is denoted by $\theta_1$, the refraction angle of the refracted ray of light at the light-shooting out surface 16 of the transparent screen 11 is denoted by $\theta_2$, the vertex angle of the edge 15A formed by the faces 15a, 15b is denoted by $\alpha_1$, and the angle formed by the light-shooting out surface 16 and the face 15a looking downward is denoted by $\alpha_2$. $\tan \alpha_2$ is given by the following equation that $$\tan \alpha_2 = [n_2 \sin\{\sin^{-1}((n_3/n_2)\sin\theta_2 + n_1 \sin\theta_1) + 2\alpha_1\} + n_1 \sin\theta_1]/[n_1 \cos\theta_1 - n_2 \cos\{\sin^{-1}((n_3/n_2)\sin\theta_2 + n_1 \sin\theta_1) + 2\alpha_1\}].$$

The transparent screen 11 having the sawlike prismatic surface 15 which has the function of totally reflecting the ray of light incident on the face 15b looking upward to the light-shooting out surface 16, when the angle $\theta_1$ formed by the ray of light $B_1$ incident on the face 15a looking downward and the optical axis 17 of the liquid crystal projector 12 is greater than 40° and less that 90°, can be realized by determining the Fresnel angle $\alpha_2$ satisfying the above equation. It should be noted that the aforementioned condition imposed on the angle $\theta_1$ is automatically satisfied in case that an angle formed by the outermost light of the light flux outputted from the projector 12 and the optical axis 17 of the projector 12 is 90°, and an angle formed by the innermost light of the same light flux and the same optical axis is 40°. According to the aforementioned structure, even in case that half the angle of view W of the projector 12 is made close to 90°, and the liquid crystal projector 12 closely approaches the transparent screen 11 in FIG. 1, the ray of light $B_1$ incident on the rear surface of the transparent screen 11 at a large incidence angle can be certainly directed to the light-shooting out surface 16, so that the picture display of the rear surface projection type 10 can be further thinned down according to the invention.

Moreover, if the refraction angle of the ray of light incident on the face 15a looking downward and neighboring with the edge 15A is denoted by $\theta_{1b}$, the light transmission efficiency $\eta$ of the transparent screen 11 having the sawlike prismatic surface 15 can be made 100%, and a satisfactory picture can be obtained without attenuating brightness.

Figure 4:
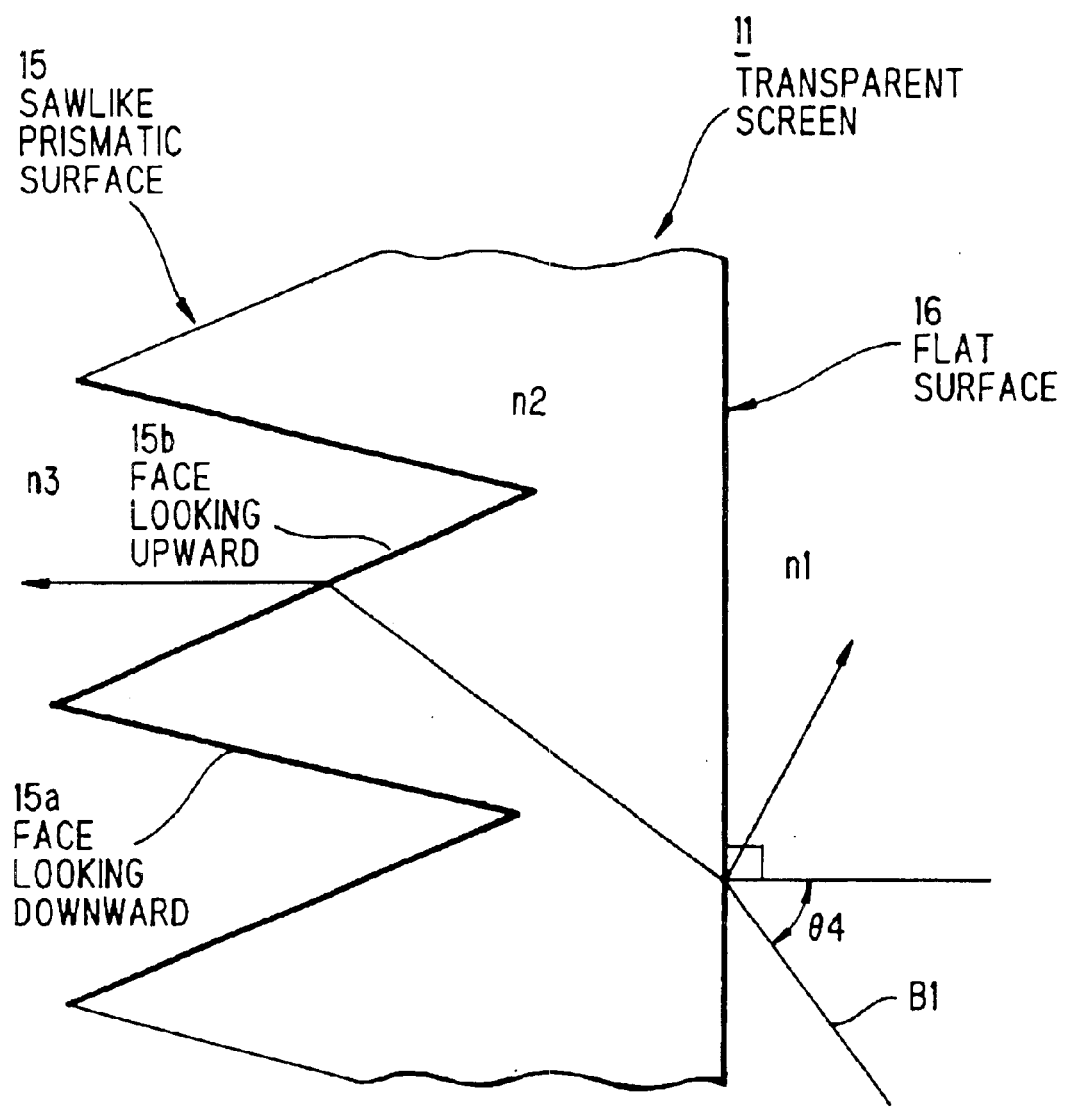
FIG. 4 is a cross-sectional view for showing an example for comparison concerning with the aforementioned embodiment of the invention.

Herein, an example for comparison with respect to the picture display of the rear surface projection type 10 according to the embodiment will be explained. FIG. 4 is a partially enlarged cross-sectional view for showing a transparent screen according to the aforementioned example for comparison. The order of arrangement of the sawlike prismatic surface 15 and the light-shooting out surface 16 in the transparent screen 11 according to the embodiment shown in FIG. 3 is inverted in that shown in FIG. 4 for showing the example for comparison.

For simplicity of explanation, $B_1$ shown in FIG. 4 will be expressed as a light flux. The light flux $B_1$ outputted from the liquid crystal projector 12 (see FIG. 1) reaches the flat surface 16 which served as the light-shooting out surface 16 of the transparent screen 11 in the embodiment shown in FIG. 3, and is shot out from the sawlike prismatic surface 15 after passing through the transparent screen 11. In this case, the greater part of the light flux $B_1$ incident on the flat surface 16 is reflected, because the incidence angle of the light flux $B_1$ is large. The remains of the light flux $B_1$ is transmitted into the transparent screen 11, refracted by the boundary surface 15b, and observed from the outside. In case that the transparent screen 11 is observed from the outside, the brightness is lowered because of reflection of the light flux $B_1$ at the flat surface 16, and the quality of the picture is degraded.

However, in the picture display of the rear surface projection type 10 according to the invention, when the angle $\theta_1$ shown in FIG. 3 is greater that 40° and less that 90°, the ray of light $B_1$ incident on the face 15a looking downward is efficiently transmitted into the transparent screen 11, and totally reflected by the face 15b looking upward to the light shooting-out surface 16. Accordingly, even in case that half the angle of view of the liquid crystal projector 12 increases, and the incidence angle of the ray of light incident on the transparent screen 11 is increases, the ray of light $B_1$ incident on the transparent screen 11 can be efficiency transmitted therethrough, and the picture clearly projected on the transparent screen 11 can be enjoyed by the user sitting beyond the projector 12.

Thereupon, if the external light incident on the front (left) surface of the transparent screen 11 passes therethrough, there arises a possibility that the external light will be scattered diffusedly by inner surfaces of a casing for accommodating the transparent screen 11, and undesired images (ghosts) will be formed at irregular positions on the transparent screen 11. So, as shown in FIG. 5, the faces 15b looking upward and neighboring with the edges 15A on the sawlike prismatic surface 15 are stained with black ink to form light absorption layers 33. Accordingly, the external lights $B_2$ penetrating into the inner space of the transparent screen 11 can be absorbed by the light absorption layers 33 certainly, and the ghosts can be suppressed.

As mentioned in the above, according to the picture display of the rear surface projection type according to the invention, even in case that the angle of incidence of the light flux incident on the transparent screen is increased because of the wide angle of view of the projection optical system originating in the thinned projector, the light flux can be efficiently transmitted into the transparent screen, and totally guided to the light-shooting out surface of the same. Accordingly, the brightness and the quality of the picture can be certainly prevented from being degraded because of reflection of light at a boundary surface between media, and the user can enjoy the picture with the excellent quality.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A picture display of a rear surface projection type comprising:

a projector for shooting out a light flux modulated by a picture, a transparent screen, on a rear surface of which said light flux shot out from said projector is projected, and a sawlike prismatic surface which is formed on said rear surface of said transparent screen, and provided with plural edges shaped into concentric circles centering around a central point situated outside said transparent screen, wherein an optical axis of said projector passes through said central point, and a ray of light incident on a first face looking downward and neighboring with each of said plural edges is transmitted into said transparent screen, and said ray of light transmitted through said first face is reflected by a second face looking upward and neighboring with said same edge to a front surface of said transparent screen, wherein an angle formed by said ray of light incident on said first face and said optical axis of said projector is greater than 40° and less than 90°, wherein:

an angle α2 formed by said first face and a line perpendicular to said optical axis of said projector is given by a following equation that $$\tan\alpha_2 = [n_2 \sin\{\sin^{-1}((n_3/n_2)\sin\theta_2 + n_1\sin\theta_1) + 2\alpha_1\} + n_1\sin\theta_1]/[n_1\cos\theta_1 - n_2\cos\{\sin^{-1}((n_3/n_2)\sin\theta_2 + n_1\sin\theta_1) + 2\alpha_1\}],$$

wherein a refractive index of a first medium brought into contact with said sawlike prismatic surface of said transparent screen is denoted by n1, a refractive index of a second medium forming said transparent screen is denoted by n2, a refractive index of a third medium brought into contact with a front surface of said transparent screen is denoted by n3, an angle formed by said ray of light incident on said first face and said optical axis of said projector is denoted by θ1, a refraction angle of a ray of light shot out from said front surface of said transparent screen is denoted by θ2, and an angle formed by said first and second faces is denoted by α1.

2. A picture display of a rear surface projection type according to claim 1, wherein:

a transmission efficiency η of said ray of light incident on said sawlike prismatic surface is given by a following equation that $$\eta = \sin\alpha_2 \cos\alpha_2\{\tan(90° - \alpha_2) + \tan\theta_1\}\{(1/\tan\alpha_1) - \tan\theta_{1b}\}$$

wherein $\theta_{1b}$ is a refraction angle of said ray of light incident on said first face looking downward of said sawlike prismatic surface.

3. A picture display of a rear surface projection type according to claim 1, wherein a light absorption layer operable to absorb an external light transmitted into said transparent screen through said front surface is formed on an external surface of said second face looking upward.

4. A picture display of a rear surface projection type according to claim 3, wherein said light absorption layer comprises black ink.

5. A picture display of a rear surface projection type comprising:

a projector for shooting out a light flux modulated by a picture, a transparent screen, on a rear surface of which said light flux shot out from said projector is projected, and a sawlike prismatic surface which is formed on said rear surface of said transparent screen, and provided with plural edges shaped into concentric circles centering around a central point situated outside said transparent screen, wherein an optical axis of said projector passes through said central point, and a ray of light incident on a first face looking downward and neighboring with each of said plural edges is transmitted into said transparent screen, and said ray of light transmitted through said first face is reflected by a second face looking upward and neighboring with said same edge to a front surface of said transparent screen, wherein an angle formed by said ray of light incident on said first face and said optical axis of said projector is greater than 40° and less than 90°, wherein:

a light absorption layer for absorbing an external light transmitted into said transparent screen through said front surface thereof is formed only along said plurality of edges on an external surface of each second face looking upward.

6. A picture display of a rear surface projection type according to claim 5, wherein said light absorption layer comprises black ink.

* * * * *